(12) United States Patent
Xuan

(10) Patent No.: US 9,503,408 B2
(45) Date of Patent: Nov. 22, 2016

(54) METHOD AND SYSTEM FOR RECEIVING AND SENDING E-MAIL IN NETWORK APPLICATION SYSTEM

(71) Applicant: TENCENT TECHNOLOGY (SHENZHEN) COMPANY LIMITED, Shenzhen (CN)

(72) Inventor: Liyong Xuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/438,360

(22) PCT Filed: Sep. 18, 2013

(86) PCT No.: PCT/CN2013/083731
§ 371 (c)(1),
(2) Date: Apr. 24, 2015

(87) PCT Pub. No.: WO2014/067360
PCT Pub. Date: May 8, 2014

(65) Prior Publication Data
US 2015/0288639 A1 Oct. 8, 2015

(30) Foreign Application Priority Data
Nov. 2, 2012 (CN) .......................... 2012 1 0431819

(51) Int. Cl.
*H04L 12/58* (2006.01)
(52) U.S. Cl.
CPC .............. *H04L 51/22* (2013.01); *H04L 51/28* (2013.01)
(58) Field of Classification Search
CPC ................................ H04L 51/22; H04L 51/28

USPC ......................................................... 709/206
See application file for complete search history.

(56) References Cited

U.S. PATENT DOCUMENTS

| | | | | |
|---|---|---|---|---|
| 2001/0020242 A1* | 9/2001 | Gupta | ................... | G06Q 30/02 715/210 |
| 2010/0299214 A1* | 11/2010 | Sahai | ................. | G06Q 30/0275 705/14.71 |
| 2012/0240224 A1 | 9/2012 | Payne et al. | | |

FOREIGN PATENT DOCUMENTS

| | | |
|---|---|---|
| CN | 101247563 A | 8/2008 |
| CN | 101325561 A | 12/2008 |

(Continued)

OTHER PUBLICATIONS

Written Opinion (English translation), International Application No. PCT/CN2013/083731, mailed Dec. 26, 2013.

(Continued)

*Primary Examiner* — Suraj Joshi
(74) *Attorney, Agent, or Firm* — Marshall, Gerstein & Borun LLP

(57) ABSTRACT

A method and system for receiving and sending an email, including: generating a proxy mailbox corresponding to a registered user and recording a correspondence between an address of the proxy mailbox and an address of a real mailbox of the user; receiving a click request of a login user for network medium information presented by the network application system; establishing information about a binding relationship between an e-mail address of an advertiser of the network medium information and an address of a proxy mailbox of the login user; and determining, after the proxy mailbox receives an e-mail, whether an e-mail address of a sender of the e-mail and the address of the proxy mailbox have the binding relationship, and if yes, querying an address of a real mailbox of the user corresponding to the address of the proxy mailbox and forwarding the received e-mail to the found real mailbox.

12 Claims, 3 Drawing Sheets

(56) References Cited

FOREIGN PATENT DOCUMENTS

| CN | 101599920 | 12/2009 |
|---|---|---|
| EP | 1718029 A1 | 11/2006 |

OTHER PUBLICATIONS

Search Report in International Application No. PCT/CN2013/083731 dated Dec. 26, 2013.

* cited by examiner

METHOD AND SYSTEM FOR RECEIVING AND SENDING E-MAIL IN NETWORK APPLICATION SYSTEM

RELATED APPLICATION

This application claims priority to Chinese Patent Application No. 201210431819.4, filed with the Chinese Patent Office on Nov. 2, 2012 and entitled "METHOD AND SYSTEM FOR RECEIVING AND SENDING E-MAIL IN NETWORK APPLICATION SYSTEM", which is incorporated by reference in its entirety.

FIELD OF THE TECHNOLOGY

The present application relates to Internet information processing technologies, and in particular, to a method and system for receiving and sending an email in a network application system.

BACKGROUND OF THE DISCLOSURE

As the Internet technologies develop rapidly, various network application systems appear. A network application system is generally referred to as a website. In essence, it is a communication tool. People can release information that they want to publish by using a network application system, or provide related network services by using a network application system. People can access a network application system by using a webpage browser or a dedicated client, to acquire information they need or enjoy corresponding network services.

An e-mail is an important communication manner in which information is exchanged by using an electronic means in a network application system, and is also a service technology widely used on the Internet. By using an e-mail system of a network, a user can quickly get in touch with a network user at any place of the world at very low costs. Content of e-mails may be of various forms such as words, images, or sounds.

Network medium information is all types of information that is published on all types of presentation forms (such as a webpage and a client interface) of an Internet system and uses digital code as a carrier. Generally, network medium information corresponds to a target webpage. When clicking network medium information, a user goes to a corresponding target webpage and content of the target webpage is presented to the user. Network medium information processing and presenting technologies develop fast in recent years and have been used in many industry fields, for example, the Internet advertisement processing and presenting field. The Internet advertisement is a type of network medium information.

At present, a network application system, which enables two communication parties to communicate effectively by combining network medium information and an e-mail, appears in the industry. In this network application system, network medium information is presented on a specific webpage. When a registered user clicks the network medium information, an e-mail address registered and input by the registered user is queried for and the e-mail address of the registered user is sent to an e-mail address registered and input by an advertiser of the network medium information. Because the registered user clicks the network medium information, which indicates that the registered user is interested in content of the network medium information and has a demand for further communicating with the advertiser of the network medium information, the e-mail address of the registered user is sent to the advertiser of the network medium information. The advertiser can directly communicate with the registered user through e-mails, thereby simplifying a means of communication between the two communication parties.

However, the existing network application system has the following defects:

The address of the real mailbox of the registered user is directly disclosed to the advertiser of the network medium information that the user clicks, which results in disclosure of private information of the user and a low security level of private information.

Besides, if the advertiser of the clicked network medium information is an illegal person or the advertiser informs an illegal person of the address of the real mailbox of the registered user, the real mailbox of the registered user may receive a great number of junk mails, thereby severely threatening mailbox security and interfering with normal e-mail communication.

SUMMARY

In view of this, a main objective of the present application is to provide a method and system for receiving and sending an email in a network application system, so as to improve security of private information of a registered user in a network application system and reduce interference of junk mails to a real mailbox of the registered user.

The technical solutions of the present application are implemented in this way:

A method for receiving and sending an e-mail in a network application system includes:

generating a proxy mailbox corresponding to a registered user of a network application system and recording a correspondence between an address of the proxy mailbox and an address of a real mailbox of the user;

querying, after a click request of a login user for network medium information presented by the network application system is received, for an e-mail address of an advertiser of the network medium information and an address of a proxy mailbox of the login user and establishing information about a binding relationship between the e-mail address of the advertiser of the network medium information and the address of the proxy mailbox of the login user; and determining, after the proxy mailbox receives an e-mail, whether an e-mail address of a sender of the e-mail and the address of the proxy mailbox have the binding relationship, and querying for an address of a real mailbox of the user corresponding to the address of the proxy mailbox and forwarding the received e-mail to the found real mailbox of the user if the e-mail address of the sender of the e-mail and the address of the proxy mailbox have the binding relationship.

A system for receiving and sending an e-mail in a network application system is provided. The system for receiving and sending an e-mail includes:

a proxy mailbox generating module, configured to generate a proxy mailbox corresponding to a registered user of a network application system and record a correspondence between an address of the proxy mailbox and an address of a real mailbox of the user;

a binding module, configured to query, after a click request of a login user for network medium information presented by the network application system is received, for an e-mail address of an advertiser of the network medium information and an address of a proxy mailbox of the login user and establish information about a binding relationship between the e-mail address of the advertiser of the network medium information and the address of the proxy mailbox of the login user; and a proxy mailbox server, configured to determine, after the proxy mailbox receives an e-mail, whether an e-mail address of a sender of the e-mail and the address of the proxy mailbox have the binding relationship, and query for an address of a real mailbox of the user corresponding to the address of the proxy mailbox and forward the received e-mail to the found real mailbox of the user if the e-mail address of the sender of the e-mail and the address of the proxy mailbox have the binding relationship.

A storage medium is used for storing a computer executable instruction; and the computer executable instruction is used for controlling a computer to execute a method for receiving and sending an e-mail in a network application system. The method includes:

setting a proxy mailbox corresponding to a registered user of a network application system and recording a correspondence between an address of the proxy mailbox and an address of a real mailbox of the user;

querying, after a click request of a login user for network medium information presented by the network application system is received, for an e-mail address of an advertiser of the network medium information and an address of a proxy mailbox of the login user and establishing information about a binding relationship between the e-mail address of the advertiser of the network medium information and the address of the proxy mailbox of the login user; and determining, after the proxy mailbox receives an e-mail, whether an e-mail address of a sender of the e-mail and the address of the proxy mailbox have the binding relationship, and querying for an address of a real mailbox of the user corresponding to the address of the proxy mailbox and forwarding the received e-mail to the found real mailbox of the user if the e-mail address of the sender of the e-mail and the address of the proxy mailbox have the binding relationship.

In the present application compared with the existing technology, a corresponding proxy mailbox is generated for a registered user and an advertiser of network medium information is only informed of an address of the proxy mailbox, so as to prevent disclosure of information about an address of a real mailbox of the user and improve security of private information of the registered user; moreover, in the present application, after a click request of a login user for the network medium information presented by a network application system is received, information about a binding relationship between a mailbox of the advertiser of the network medium information and a proxy mailbox of the login user is established; and after the proxy mailbox receives an e-mail, an identity of a sender of the e-mail needs to be authenticated, that is, only if a mailbox of the sender and the proxy mailbox have the binding relationship, the real mailbox of the user corresponding to the proxy mailbox is queried for and the received e-mail is forwarded to the found real mailbox of the user. Therefore, even if an illegal person obtains the address of the proxy mailbox of the registered user and send a great number of junk mails to the proxy mailbox, if identity authentication fails, the junk mails are not sent to the real mailbox of the registered user, which reduces interference of the junk mails to the real mailbox of the registered user.

DESCRIPTION OF EMBODIMENTS

The following further describes the present application in detail with reference to the accompanying drawings and specific embodiments.

Figure 1:
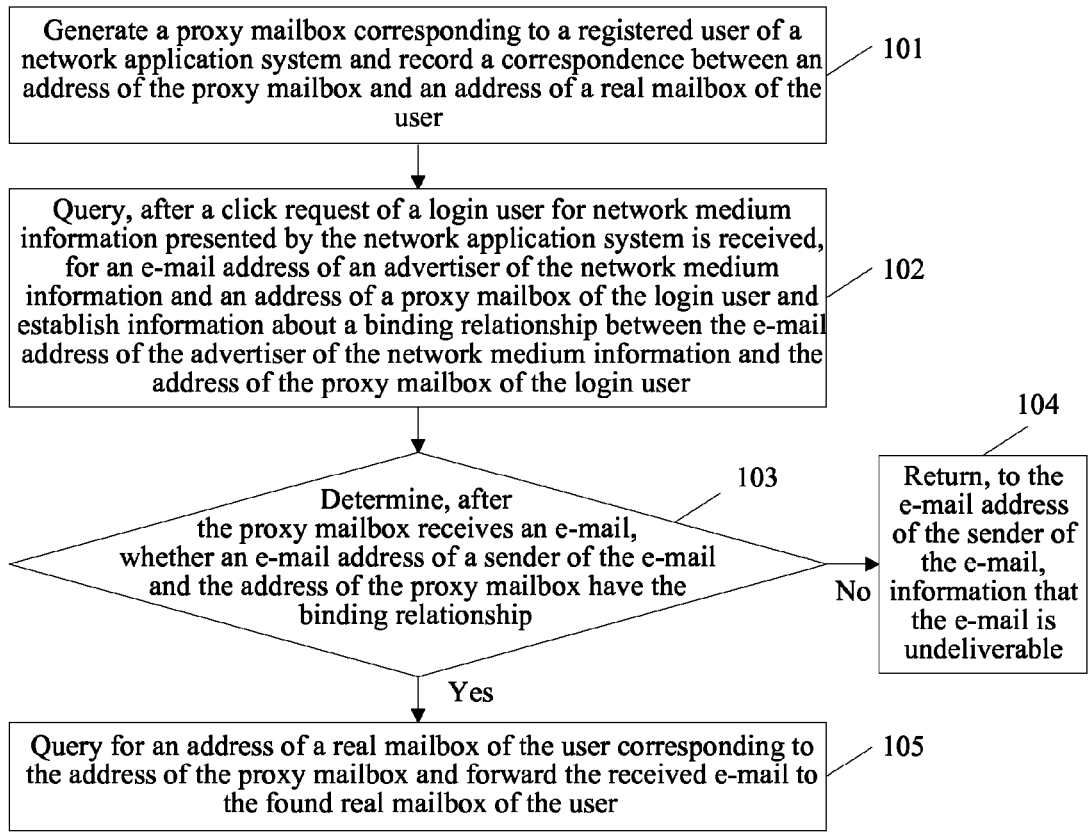
FIG. 1 is a flowchart of a method for receiving and sending an e-mail in a network application system according to the present application.

FIG. 1 is a flowchart of a method for receiving and sending an e-mail in a network application system according to the present application. Referring to FIG. 1, the method mainly includes:

Step 101: Generate a proxy mailbox corresponding to a registered user of a network application system and record a correspondence between an address of the proxy mailbox and an address of a real mailbox of the user.

The proxy mailbox corresponding to the registered user of the network application system may be generated when the user registers or at another specified time.

A manner for generating the proxy mailbox corresponding to the registered user of the network application system is: presetting a proxy e-mail server, automatically registering at least one mailbox for the registered user in the proxy e-mail server, and using the registered mailbox as a proxy mailbox of the registered user; in the present application, detailed information about e-mail receiving and sending of the proxy mailbox generated for the registered user needs to be monitored and controlled.

The address of the real mailbox of the registered user is input to the network application system when the user registers. After the proxy mailbox is generated for the registered user, the address of the real mailbox of the registered user is queried for in a storage module of the network application system and a correspondence between the address of the generated proxy mailbox and the address of the real mailbox of the registered user is recorded. A manner may be creating a data table, for example, a proxy_mail table shown in Table 1, and information about the address of the generated proxy mailbox and the address of the real mailbox of the registered user is recorded as an entry in Table 1.

TABLE 1

(proxy_mail table)

| Column name | Notes |
|---|---|
| proxyMail | Address of the proxy mailbox |
| realMail | Address of the real mailbox |
| createTime | Creating time of the proxy mailbox |

After the proxy mailbox corresponding to the registered user is generated in the network application system, the address of the proxy mailbox of the registered user needs to be sent to an advertiser of network medium information presented by the network application system. The address of the proxy mailbox of the registered user may be sent on multiple occasions. For example, in an embodiment, after a click request of a login user for network medium information presented by the network application system is received, the address of the proxy mailbox corresponding to the login user may be sent to a specified receiving apparatus of the advertiser of the clicked network medium information. The specified receiving apparatus of the advertiser may be a mailbox of the advertiser, an inbox after the advertiser logs onto the network application system, or even a specified short message receiving apparatus, or the like.

In a further embodiment of the present application, after a click request of a login user for network medium information presented by the network application system is received, the address of the proxy mailbox of the login user and an identifier of the clicked network medium information may be sent to a specified receiving apparatus of the advertiser of the network medium information in the present application. In this way, the advertiser of the network medium information can tell which users are interested in what kind of network medium information, so as to divide addresses of proxy mailboxes of users and accordingly send e-mails of different content to different categories of user proxy mailboxes, thereby implementing accurate matching between e-mail content and a target user and targeted advertising.

After an advertiser of network medium information posts network medium information in the network application system, the network medium information may be presented to a user on a specific webpage according to a specified matching strategy, and the user may click the network medium information to view content of a target webpage redirected from the network medium information.

Step 102: Query, after a click request of a login user for network medium information presented by the network application system is received, for an e-mail address of an advertiser of the network medium information and an address of a proxy mailbox of the login user and establish information about a binding relationship between the e-mail address of the advertiser of the network medium information and the address of the proxy mailbox of the login user.

The login user herein is an appellation of a registered user in the network application system after the registered user logs onto the network application system, and the network application system can find, according to an account of the login user, the address of the proxy mailbox generated for the login user. The e-mail address of the advertiser of the network medium information is input to the network application system when the advertiser registers. After a click request of a login user for network medium information presented by the network application system is received, an e-mail address of an advertiser of the network medium information may be queried for according to a registered account of the advertiser, and at the same time, an address of a proxy mailbox of the login user may be queried for according to an account of the login user, and then information about a binding relationship between the e-mail address of the advertiser of the network medium information and the address of the proxy mailbox of the login user is established. For example, in an embodiment, a data table may be created, for example, a proxyConfig table shown in Table 2, and the e-mail address of the advertiser of the network medium information and the address of the proxy mailbox of the login user are bound and recorded as an entry in Table 2.

TABLE 2

(proxyConfig table)

| Column name | Notes |
|---|---|
| sendMail | E-mail address of the advertiser of the network medium information |
| proxyMail | Address of the proxy mailbox of the login user clicking the network medium information |

After receiving addresses of proxy mailboxes of registered users of the network application system, the advertiser of the network medium information may send, according to needs, e-mails of corresponding content to these addresses of the proxy mailboxes, so as to strengthen e-mail communication between the advertiser and target users. According to the method and the system in the present application, detailed information about e-mail receiving and sending of the proxy mailbox generated for the registered user needs to be monitored and controlled.

Step 103 to step 105: Determine, after the proxy mailbox receives an e-mail, whether an e-mail address of a sender of the e-mail and the address of the proxy mailbox have the binding relationship, and query for an address of a real mailbox of the user corresponding to the address of the proxy mailbox and forward the received e-mail to the found real mailbox of the user if the e-mail address of the sender of the e-mail and the address of the proxy mailbox have the binding relationship; and return, to the e-mail address of the sender of the e-mail, information that the e-mail is undeliverable, if it is determined that the e-mail address of the sender of the e-mail and the address of the proxy mailbox do not have the binding relationship.

In step 103, a manner for determining whether the e-mail address of the sender of the e-mail and the address of the proxy mailbox have the binding relationship may include:

firstly, determining whether the e-mail address of the sender of the e-mail is in the column of sendMail in the proxyConfig table, and regarding the sender as an illegal user, that is, determining that the e-mail address of the sender and the address of the proxy mailbox do not have the binding relationship, if the e-mail address of the sender of the e-mail is not in the column of sendMail; and secondly, further determining whether the address of the proxy mailbox is recorded in proxyMail corresponding to the e-mail address of the sender if the e-mail address of the sender is in the column of sendMail, and regarding the sender as an illegal user, that is, determining that the e-mail address of the sender and the address of the proxy mailbox do not have the binding relationship if the address of the proxy mailbox is not recorded in proxyMail corresponding to the e-mail address of the sender, or determining that the e-mail address of the sender and the address of the proxy mailbox have the binding relationship if the address of the proxy mailbox is recorded in proxyMail corresponding to the e-mail address of the sender.

Through step 101 to step 105, the address of the real mailbox of the user is not disclosed to the advertiser of the network medium information, thereby protecting private information of the user. Moreover, an identity of the sender of the e-mail is authenticated, that is, only if the mailbox of the sender and the proxy mailbox receiving the e-mail have the binding relationship, the real mailbox of the user corresponding to the proxy mailbox is queried for and the received e-mail is forwarded to the found real mailbox of the user. Therefore, even if an illegal person obtains the address of the proxy mailbox of the registered user and sends a great number of junk mails to the proxy mailbox, if identity authentication fails, the junk mails are not sent to the real mailbox of the registered user, thereby reducing interference of the junk mails to the real mailbox of the registered user.

Figure 2:
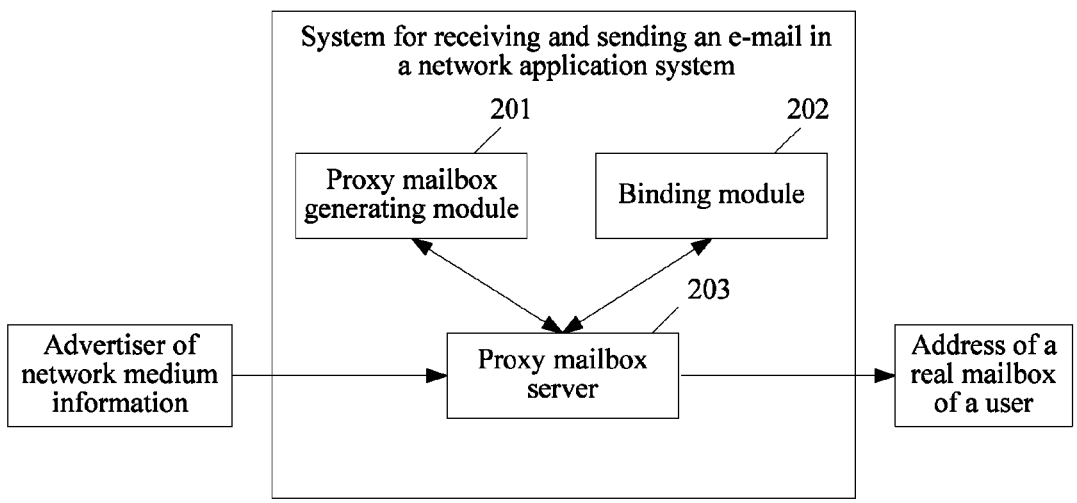
FIG. 2 is a schematic composition diagram of a system for receiving and sending an e-mail in a network application system according to the present application.

The present application further discloses a system for receiving and sending an e-mail in a network application system, which is corresponding to the method in the present application, so as to execute the method in the present application. FIG. 2 is a schematic composition diagram of a system for receiving and sending an e-mail in a network application system according to the present application. Referring to FIG. 2, the system for receiving and sending an e-mail includes:

a proxy mailbox generating module 201, configured to generate a proxy mailbox corresponding to a registered user of a network application system and record a correspondence between an address of the proxy mailbox and an address of a real mailbox of the user, where a generating manner is that the proxy mailbox generating module 201 may register and generate the corresponding proxy mailbox for the registered user in a proxy mailbox server 203;

a binding module 202, configured to query, after a click request of a login user for network medium information presented by the network application system is received, for an e-mail address of an advertiser of the network medium information and an address of a proxy mailbox of the login user and establish information about a binding relationship between the e-mail address of the advertiser of the network medium information and the address of the proxy mailbox of the login user; and a proxy mailbox server 203, where the proxy mailbox corresponding to the registered user is run in the proxy mailbox server 203 and the proxy mailbox server 203 is configured to determine, after the proxy mailbox receives an e-mail, whether an e-mail address of a sender of the e-mail and the address of the proxy mailbox have the binding relationship, and query for an address of a real mailbox of the user corresponding to the address of the proxy mailbox and forward the e-mail to the found real mailbox of the user if the e-mail address of the sender of the e-mail and the address of the proxy mailbox have the binding relationship.

The binding module 202 may be further configured to: send, after a click request of a login user for network medium information presented by the network application system is received, the address of the proxy mailbox of the login user to a specified receiving apparatus of the advertiser of the clicked network medium information; or send, after a click request of a login user for network medium information presented by the network application system is received, the address of the proxy mailbox of the login user and an identifier of the clicked network medium information to a specified receiving apparatus of the advertiser of the network medium information.

Figure 3:
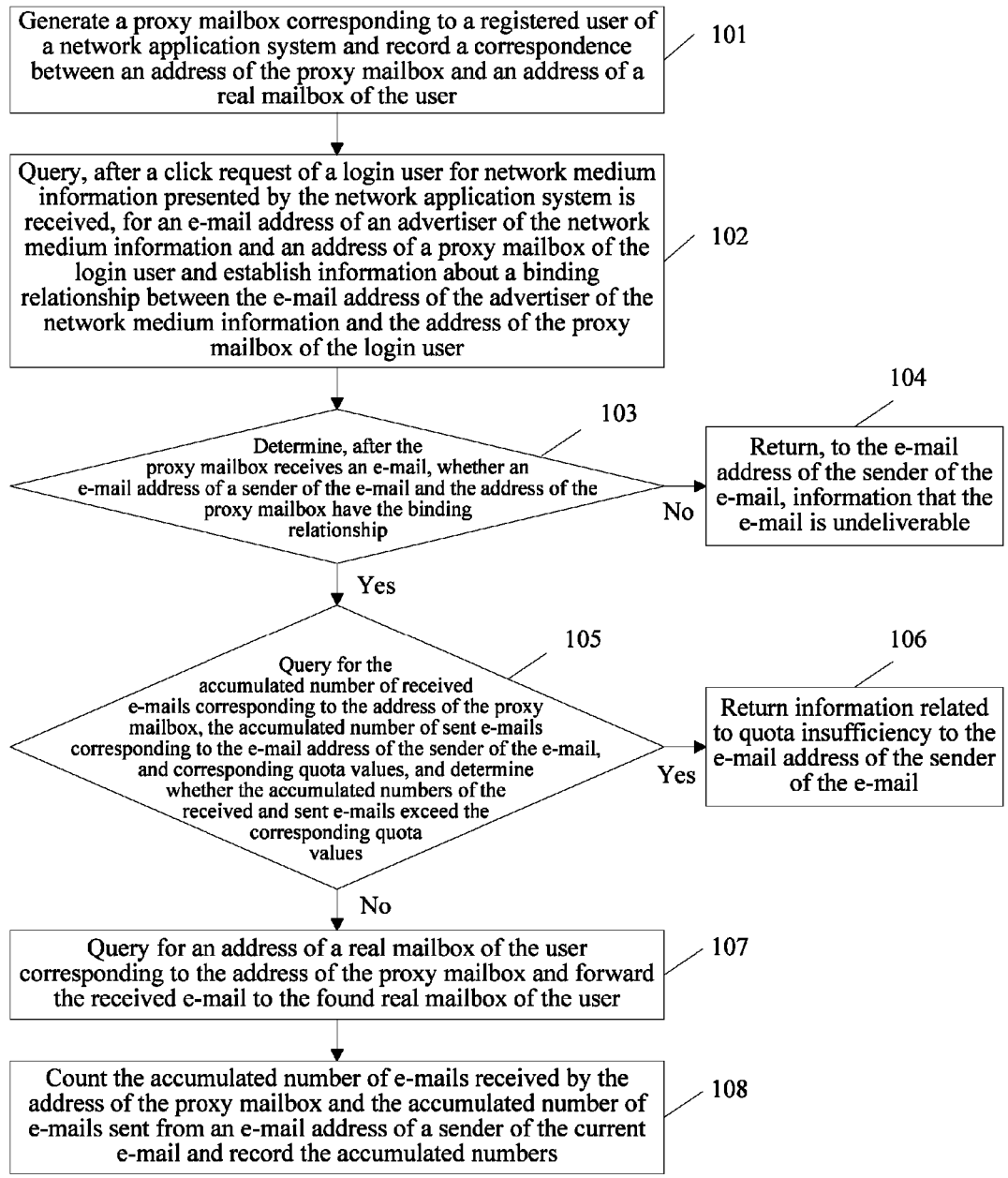
FIG. 3 is a flowchart of an embodiment of adding a quota limit in a method for receiving and sending an e-mail in a network application system according to the present application.

In an embodiment of the method in the present application, quotas may be further set for the number of e-mails that the address of the proxy mailbox of the registered user is allowed to receive and the number of e-mails that the e-mail address of the advertiser of the network medium information is allowed to send. FIG. 3 is a flowchart of an embodiment of adding a quota limit in a method for receiving and sending an e-mail in a network application system according to the present application. Referring to FIG. 3, in this embodiment, an e-mail receiving quota value of the address of the proxy mailbox of the registered user and an e-mail sending quota value of the e-mail address of the advertiser of the network medium information need to be set in advance. After the e-mail received by the proxy mailbox is forwarded to the real mailbox of the user, that is, after step 107 in FIG. 3, the embodiment further includes step 108: count the accumulated number of e-mails received by the address of the proxy mailbox and the accumulated number of e-mails sent from an e-mail address of a sender of the current e-mail and record the accumulated numbers.

In this embodiment, after the proxy mailbox receives an e-mail and it is determined that an e-mail address of a sender of the e-mail and the address of the proxy mailbox have the binding relationship, that is, after step 103, before an address of a real mailbox of the user corresponding to the address of the proxy mailbox is queried for, that is, before step 107, the embodiment further includes step 105 and step 106: query for the accumulated number of received e-mails corresponding to the address of the proxy mailbox, the accumulated number of sent e-mails corresponding to the e-mail address of the sender of the e-mail, and corresponding quota values, and determine whether the accumulated numbers of the received and sent e-mails exceed the corresponding quota values, and skip executing the subsequent process and return information related to quota insufficiency to the e-mail address of the sender of the e-mail if the accumulated numbers exceed the corresponding quota values, or otherwise, execute the subsequent process, that is, execute subsequent steps 107 and 108.

In the embodiment of setting a quota in the present application, the following three specific implementation manners may be further included.

The first quota setting implementation manner is:

further setting an e-mail sending quota value in the information about the binding relationship between the e-mail address of the advertiser of the network medium information and the address of the proxy mailbox of the login user; and each time after an e-mail received by the proxy mailbox is forwarded to the real mailbox of the user, the manner further includes: counting the accumulated number of e-mails sent from an e-mail address of a sender of the current e-mail to the address of the proxy mailbox and recording the accumulated number in the information about the binding relationship.

For example, two fields are furthered added to the binding relationship recorded in the foregoing proxyConfig table shown in Table 3.

TABLE 3

| Column name | Notes |
|---|---|
| sendMail | E-mail address of the advertiser of the network medium information |
| proxyMail | Address of the proxy mailbox of the login user clicking the network medium information |
| sendMailTimes | The accumulated number of e-mails sent from the e-mail address in the first line to the second e-mail address in the second line. A default value is 0, and the field is increased by 1 each time an e-mail is sent. |
| canSendMailTimes | A quota value for the number of e-mails that the e-mail address in the first line is allowed to send to the second e-mail address in the second line. The quota value may be set by an administrator. If the quota value is 0, it is determined by default that the number of e-mails that can be sent is not limited and e-mails can be sent at will. |

After the proxy mailbox receives an e-mail and it is determined that an e-mail address of a sender of the e-mail and the address of the proxy mailbox have the binding relationship, before the address of the real mailbox of the user corresponding to the address of the proxy mailbox is queried for, the manner further includes: querying for the information about the binding relationship, for example, querying for the information in Table 3, so as to obtain the accumulated number sendMailTimes of e-mails sent from the e-mail address of the sender of the current e-mail to the address of the proxy mailbox and the quota value canSendMailTimes, determining whether the accumulated number exceeds the corresponding quota value, and skipping executing the subsequent process and returning information related to quota insufficiency to the e-mail address of the sender of the e-mail if the accumulated number exceeds the corresponding quota value, or otherwise, executing the subsequent process.

The second quota setting implementation manner is:

setting an e-mail sending quota value corresponding to the e-mail address of the advertiser of the network medium information; and each time after an e-mail received by the proxy mailbox is forwarded to the real mailbox of the user, the manner further includes: counting the accumulated number of e-mails sent from an e-mail address of a sender of the current e-mail and recording the accumulated number; and after the proxy mailbox receives an e-mail and it is determined that an e-mail address of a sender of the e-mail and the address of the proxy mailbox have the binding relationship, before the address of the real mailbox of the user corresponding to the address of the proxy mailbox is queried for, the manner further includes: querying for the e-mail sending quota value of the e-mail address of the sender of the e-mail and the accumulated number of sent e-mails, determining whether the accumulated number of the sent e-mails exceeds the e-mail sending quota value, and skipping executing the subsequent process and returning information related to quota insufficiency to the e-mail address of the sender of the e-mail if the accumulated number of the sent e-mails exceeds the e-mail sending quota value, or otherwise, executing the subsequent process.

The third quota setting implementation manner is:

setting an e-mail receiving quota value corresponding to the address of the proxy mailbox of the registered user; and each time after an e-mail received by the proxy mailbox is forwarded to the real mailbox of the user, the manner further includes: counting the accumulated number of e-mails received by the address of the proxy mailbox of the user and recording the accumulated number; and after the proxy mailbox receives an e-mail and it is determined that an e-mail address of a sender of the e-mail and the address of the proxy mailbox have the binding relationship, before the address of the real mailbox of the user corresponding to the address of the proxy mailbox is queried for, the manner further includes: querying for the accumulated number of received e-mails corresponding to the address of the proxy mailbox and the e-mail receiving quota value, determining whether the accumulated number of the received e-mails exceeds the e-mail receiving quota value, and skipping executing the subsequent process and returning information related to quota insufficiency to the e-mail address of the sender of the e-mail if the accumulated number of the received e-mails exceeds the e-mail receiving quota value, or otherwise, executing the subsequent process.

Figure 4:
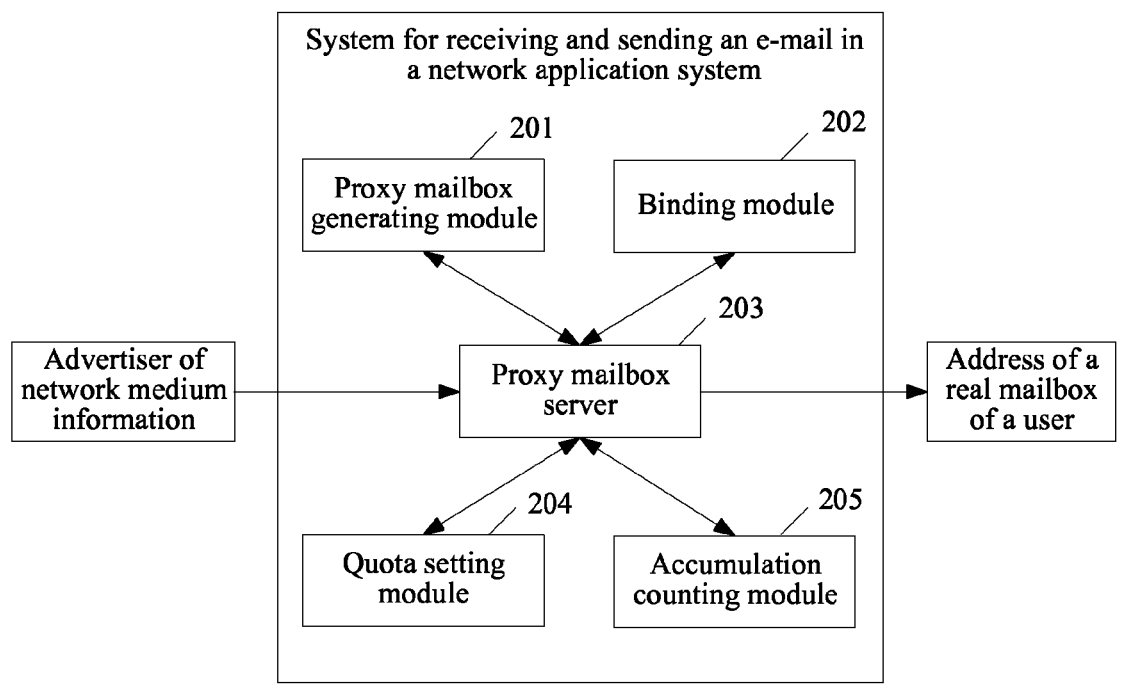
FIG. 4 is a schematic composition diagram of another embodiment of a system for receiving and sending an e-mail in a network application system according to the present application.

In an embodiment of the system for receiving and sending an e-mail in the present application, which is corresponding to the method, quotas may also be further set for the number of e-mails that the address of the proxy mailbox of the registered user is allowed to receive and the number of e-mails that the e-mail address of the advertiser of the network medium information is allowed to send. FIG. 4 is a schematic composition diagram of another embodiment of a system for receiving and sending an e-mail in a network application system according to the present application. Referring to FIG. 4, in this embodiment, the system for receiving and sending an e-mail further includes:

a quota setting module 204, configured to set an e-mail receiving quota value of the address of the proxy mailbox of the registered user and an e-mail sending quota value of the e-mail address of the advertiser of the network medium information; and an accumulation counting module 205, configured to count, each time after the proxy mailbox server forwards an e-mail received by the proxy mailbox to the real mailbox of the user, the accumulated number of e-mails received by the address of the proxy mailbox and the accumulated number of e-mails sent from an e-mail address of a sender of the current e-mail and record the accumulated numbers; and the proxy mailbox server 203 is further configured to: after the proxy mailbox receives an e-mail and it is determined that an e-mail address of a sender of the e-mail and the address of the proxy mailbox have the binding relationship, before an address of a real mailbox of the user corresponding to the address of the proxy mailbox is queried for, query for the accumulated number of received e-mails corresponding to the address of the proxy mailbox, the accumulated number of sent e-mails corresponding to the e-mail address of the sender of the e-mail, and the corresponding quota values, determine whether the accumulated numbers of the received and sent e-mails exceed the quota values, and skip executing the subsequent process if the accumulated numbers exceed the quota values, or otherwise, execute the subsequent process.

In the foregoing embodiment, in the present application, a corresponding proxy mailbox is generated for a registered user and an advertiser of network medium information is only informed of an address of the proxy mailbox, so as to prevent disclosure of information about an address of a real mailbox of the user and improve security of private information of the registered user; in another embodiment, the proxy mailbox may be a specified mailbox of the registered user and the specified mailbox may be an address of another real mailbox of the registered user; in this way, the address of the real mailbox of the user in the foregoing embodiment may be referred to as a first user real e-mail address, and the address of the another specified real mailbox of the registered user may be a second user real e-mail address. Therefore, in another embodiment of the present application, an advertiser of network medium information is only informed of an address of a proxy mailbox, that is, a second user real e-mail address, so as to prevent disclosure of information about a first user real e-mail address and improve security of private information of a registered user; moreover, in the present application, after a click request of a login user for network medium information presented by a network application system is received, information about a binding relationship between a mailbox of the advertiser of the network medium information and the second user real e-mail address of the login user is established; after the second user real e-mail address receives an e-mail, an identity of a sender of the e-mail needs to be authenticated, that is, only if a mailbox of the sender and the second user real e-mail address have the binding relationship, a first user real mailbox corresponding to the second user real e-mail address is queried for and the received e-mail is forwarded to the found first user real mailbox. Therefore, even if an illegal person obtains the second user real e-mail address of the registered user and sends a great number of junk mails to the second user real e-mail address, if identity authentication fails, the junk mails are not sent to the first real mailbox of the registered user, which reduces interference of the junk mails to the first real mailbox of the registered user.

In addition, in some embodiments provided in the present application, it should be understood that, in the disclosed system and method, the functional modules may be integrated into one processing unit, or each of the modules may exist alone physically, or two or more modules may be integrated into one unit. The integrated unit may be implemented in the form of hardware, or may be implemented in the form of a software functional unit. The functional modules in the embodiments may be located in one terminal or network node, or may be distributed on multiple terminals or network nodes.

The method and system provided in the present application may be implemented by hardware, computer readable instructions, or a combination of hardware and computer readable instructions. The computer readable instructions used in the present disclosure are stored in a readable storage medium such as a hard disk, a CD-ROM, a DVD, an optical disc, a floppy disk, a magnetic tape, an RAM, an ROM, or another suitable storage device by multiple processors; or at least some of the computer readable instructions may be replaced by specific hardware, such as a custom integrated circuit, a gate array, an FPGA, a PLD, or a computer having a specific function.

The present disclosure provides a computer readable storage medium, used for storing an instruction, so that a system or device executes the method in this specification. Specifically, the system or device provided in the present disclosure has a storage medium. Computer readable program code is stored in the storage medium, so as to implement a function of any one of the foregoing embodiments. Moreover, the system or device (or a CPU, or an MPU) is capable of reading and executing the program code stored in the storage medium.

In this case, the program code read from the storage medium can implement any one of the foregoing embodiments. Therefore, the program code and the storage medium that stores the program code are a part of the technical solutions.

The storage medium for providing the program code may be a floppy disk, a hard disk, a magnetic and optical disc, an optical disc (such as a CD-ROM, a CD-R, a CD-RW, a DVD-ROM, a DVD-RAM, a DVD-RW, or a DVD+RW), a magnetic disk, a flash memory card, an ROM, or the like. Optionally, the program code may also be downloaded from a server through a communications network.

It should be noted that, for program code executed by a computer, at least some of operations implemented by the program code may be performed by an operating system run in the computer, so as to implement the technical solution of any one of the foregoing embodiments, where the computer executes an instruction based on program code.

In addition, the program code stored in the storage medium is written to a memory, where the memory is located in an expansion card that can be inserted in a computer, or is located in an expansion unit that is connected to a computer. In an embodiment, a CPU in the expansion card or expansion unit executes, according to an instruction, at least some of operations based on program code, so as to implement the technical solution of any one of the foregoing embodiments.

The foregoing descriptions are merely preferred embodiments of the present application, but are not intended to limit the present application. Any modification, equivalent replacement, or improvement made within the spirit and principle of the present application shall fall within the protection scope of the present application.

What is claimed is:

1. A method for receiving and sending an e-mail in a network application system, comprising:
generating a proxy mailbox corresponding to a registered user of a network application system and recording a correspondence between an address of the proxy mailbox and an address of a real mailbox of the user;
querying, after a click request of a login user for network medium information presented by the network application system is received, an e-mail address of an advertiser of the network medium information and an address of a proxy mailbox of the login user and establishing information about a binding relationship between the e-mail address of the advertiser of the network medium information and the address of the proxy mailbox of the login user; and
determining, after the proxy mailbox receives an e-mail, whether an e-mail address of a sender of the e-mail and the address of the proxy mailbox have the binding relationship, and querying for an address of a real mailbox of the user corresponding to the address of the proxy mailbox and forwarding the received e-mail to the found real mailbox of the user if the e-mail address of the sender of the e-mail and the address of the proxy mailbox have the binding relationship.

2. The method according to claim 1, wherein the method further comprises:
further setting an e-mail sending quota value in the information about the binding relationship between the e-mail address of the advertiser of the network medium information and the address of the proxy mailbox of the login user;
each time after an e-mail received by the proxy mailbox is forwarded to the real mailbox of the user, the method further comprises: counting the accumulated number of e-mails sent from an e-mail address of a sender of the current e-mail to the address of the proxy mailbox and recording the accumulated number in the information about the binding relationship; and
after the proxy mailbox receives an e-mail and it is determined that an e-mail address of a sender of the e-mail and the address of the proxy mailbox have the binding relationship, before the address of the real mailbox of the user corresponding to the address of the proxy mailbox is queried for, the method further comprises: querying for the information about the binding relationship, so as to obtain the accumulated number of e-mails sent from the e-mail address of the sender of the current e-mail to the address of the proxy mailbox and the quota value, determining whether the accumulated number exceeds the corresponding quota value, and skipping executing the subsequent process if the accumulated number exceeds the corresponding quota value, or otherwise, executing a subsequent process.

3. The method according to claim 2, after it is determined that the accumulated number exceeds the quota value, further comprising: returning information related to quota insufficiency to the sender of the e-mail.

4. The method according to claim 1, wherein the method further comprises:

setting an e-mail sending quota value corresponding to the e-mail address of the advertiser of the network medium information; and each time after an e-mail received by the proxy mailbox is forwarded to the real mailbox of the user, the method further comprises: counting the accumulated number of e-mails sent from an e-mail address of a sender of the current e-mail and recording the accumulated number; and after the proxy mailbox receives an e-mail and it is determined that an e-mail address of a sender of the e-mail and the address of the proxy mailbox have the binding relationship, before the address of the real mailbox of the user corresponding to the address of the proxy mailbox is queried for, the method further comprises: querying for the e-mail sending quota value of the e-mail address of the sender of the e-mail and the accumulated number of sent e-mails, determining whether the accumulated number of the sent e-mails exceeds the e-mail sending quota value, and skipping executing the subsequent process if the accumulated number of the sent e-mails exceeds the e-mail sending quota value, or otherwise, executing the subsequent process.

5. The method according to claim 1, wherein the method further comprises:

setting an e-mail receiving quota value corresponding to the address of the proxy mailbox of the registered user; and each time after an e-mail received by the proxy mailbox is forwarded to the real mailbox of the user, the method further comprises: counting the accumulated number of e-mails received by the address of the proxy mailbox of the user and recording the accumulated number; and after the proxy mailbox receives an e-mail and it is determined that an e-mail address of a sender of the e-mail and the address of the proxy mailbox have the binding relationship, before the address of the real mailbox of the user corresponding to the address of the proxy mailbox is queried for, the method further comprises: querying for the accumulated number of received e-mails corresponding to the address of the proxy mailbox and the e-mail receiving quota value, determining whether the accumulated number of the received e-mails exceeds the e-mail receiving quota value, and skipping executing the subsequent process if the accumulated number of the received e-mails exceeds the e-mail receiving quota value, or otherwise, executing the subsequent process.

6. The method according to claim 1, after the proxy mailbox receives an e-mail, further comprising:

returning, to the e-mail address of the sender of the e-mail, information that the e-mail is undeliverable, if it is determined that the e-mail address of the sender of the e-mail and the address of the proxy mailbox do not have the binding relationship.

7. The method according to claim 1, after a click request of a login user for network medium information presented by the network application system is received, further comprising: sending the address of the proxy mailbox of the login user to a specified receiving apparatus of the advertiser of the clicked network medium information; or sending the address of the proxy mailbox of the login user and an identifier of the clicked network medium information to a specified receiving apparatus of the advertiser of the network medium information.

8. A system for receiving and sending an e-mail in a network application system, the system comprising:

a processor; and a memory storing computer readable instructions which, when executed by the processor, cause the processor to:

generate a proxy mailbox corresponding to a registered user of a network application system and record a correspondence between an address of the proxy mailbox and an address of a real mailbox of the user;

query, after a click request of a login user for network medium information presented by the network application system is received, for an e-mail address of an advertiser of the network medium information and an address of a proxy mailbox of the login user and establish information about a binding relationship between the e-mail address of the advertiser of the network medium information and the address of the proxy mailbox of the login user; and determine, after the proxy mailbox receives an e-mail, whether an e-mail address of a sender of the e-mail and the address of the proxy mailbox have the binding relationship, and query for an address of a real mailbox of the user corresponding to the address of the proxy mailbox and forward the received e-mail to the found real mailbox of the user if the e-mail address of the sender of the e-mail and the address of the proxy mailbox have the binding relationship.

9. The system for receiving and sending an e-mail according to claim 8, wherein the computer readable instructions further cause the processor to:

set an e-mail receiving quota value of the address of the proxy mailbox of the registered user and an e-mail sending quota value of the e-mail address of the advertiser of the network medium information; and count, each time after the proxy mailbox server forwards an e-mail received by the proxy mailbox to the real mailbox of the user, the accumulated number of e-mails received by the address of the proxy mailbox and the accumulated number of e-mails sent from an e-mail address of a sender of the current e-mail and record the accumulated numbers; and after the proxy mailbox receives an e-mail and it is determined that an e-mail address of a sender of the e-mail and the address of the proxy mailbox have the binding relationship, before an address of a real mailbox of the user corresponding to the address of the proxy mailbox is queried for, query for the accumulated number of received e-mails corresponding to the address of the proxy mailbox, the accumulated number of sent e-mails corresponding to the e-mail address of the sender of the e-mail, and the corresponding quota values, determine whether the accumulated numbers of the received and sent e-mails exceed the quota values, and skip executing the subsequent process if the accumulated numbers exceed the quota values, or otherwise, execute the subsequent process.

10. The system for receiving and sending an e-mail according to claim 8, wherein the computer readable instructions further cause the processor to:

send, after a click request of a login user for network medium information presented by the network application system is received, the address of the proxy mailbox of the login user to a specified receiving apparatus of the advertiser of the clicked network medium information; or send, after a click request of a login user for network medium information presented by the network application system is received, the address of the proxy mailbox of the login user and an identifier of the clicked network medium information to a specified receiving apparatus of the advertiser of the network medium information.

11. A non-transitory computer readable storage medium, used for storing a computer executable instruction, the computer executable instruction being used for controlling a computer to execute a method for receiving and sending an e-mail in a network application system, and the method comprising:

setting a proxy mailbox corresponding to a registered user of a network application system and recording a correspondence between an address of the proxy mailbox and an address of a real mailbox of the user;

querying, after a click request of a login user for network medium information presented by the network application system is received, for an e-mail address of an advertiser of the network medium information and an address of a proxy mailbox of the login user and establishing information about a binding relationship between the e-mail address of the advertiser of the network medium information and the address of the proxy mailbox of the login user; and determining, after the proxy mailbox receives an e-mail, whether an e-mail address of a sender of the e-mail and the address of the proxy mailbox have the binding relationship, and querying for an address of a real mailbox of the user corresponding to the address of the proxy mailbox and forwarding the received e-mail to the found real mailbox of the user if the e-mail address of the sender of the e-mail and the address of the proxy mailbox have the binding relationship.

12. The non-transitory computer readable storage medium according to claim 11, wherein the proxy mailbox is at least one mailbox automatically registered by a proxy mailbox server for the registered user, or an address of another real mailbox of the registered user.

* * * * *